United States Patent
Chen et al.

(10) Patent No.: US 10,769,600 B2
(45) Date of Patent: Sep. 8, 2020

(54) CRYPTOCURRENCY TRANSACTIONS USING DEBIT AND CREDIT VALUES

(71) Applicant: International Business Machines Corporation, Armonk, NY (US)

(72) Inventors: Chang Chen, Beijing (CN); Ke Wei Sun, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 551 days.

(21) Appl. No.: 15/275,996

(22) Filed: Sep. 26, 2016

(65) Prior Publication Data

US 2018/0089644 A1 Mar. 29, 2018

(51) Int. Cl.
*G06Q 20/10* (2012.01)
*G06Q 20/38* (2012.01)

(52) U.S. Cl.
CPC ........... *G06Q 20/10* (2013.01); *G06Q 20/382* (2013.01); *G06Q 2220/00* (2013.01)

(58) Field of Classification Search
None
See application file for complete search history.

(56) References Cited

U.S. PATENT DOCUMENTS 9,202,239 B2    12/2015    Van Biljon et al.
10,269,009 B1*   4/2019    Winklevoss ......... G06Q 20/105
2012/0290381 A1* 11/2012   Martin ................. G06Q 20/405
                                                        705/14.34
2014/0095383 A1*  4/2014   Rao ....................... G06Q 20/385
                                                        705/43
2015/0278887 A1  10/2015   Almond
2015/0310476 A1  10/2015   Gadwa
2015/0348169 A1  12/2015   Harris et al.
2016/0260091 A1*  9/2016   Tobias ............... G06Q 20/3678
2016/0283920 A1*  9/2016   Fisher ................... H04L 9/3297
2016/0283941 A1*  9/2016   Andrade ............ G06Q 20/4014

OTHER PUBLICATIONS

O'Dwyer, Rachel; "The Revolution will (not) be decentralised:Blockchains"; Commons Transition; (2015);5 pages.

* cited by examiner

*Primary Examiner* — Olabode Akintola
(74) *Attorney, Agent, or Firm* — Cantor Colburn LLP; Joseph Petrokaitis

(57) ABSTRACT

An embodiment of a computer implemented method for transferring cryptocurrency amounts includes receiving, by a processing device, a request to transfer an amount of a cryptocurrency from a first storage location. The method also includes, in response to the request, automatically generating a credit value and a debit value as a related pair, each of the credit value and the debit value having an identifier that relates the credit value and the debit value to the amount of the cryptocurrency, one of the credit value and the debit value being a positive value and another of the credit value and the debit value being a negative value, and transferring the amount of the cryptocurrency by the transaction module from a wallet connected to the transaction module to a second storage location.

20 Claims, 7 Drawing Sheets

CRYPTOCURRENCY TRANSACTIONS USING DEBIT AND CREDIT VALUES

BACKGROUND

The present invention relates generally to cryptocurrency transactions, and more specifically, to transferring assets and executing transactions using cryptocurrencies based on the creation of debit and credit values associated with transferred cryptocurrency amounts.

Cryptocurrencies, such as bitcoin, are an increasingly used method of purchasing goods and services. For example, bitcoin and similar currencies are increasingly being accepted by vendors and providers of online goods and services. Current transactional models, such as blockchain models used to create and transfer bitcoins, lack the support for logically all-node-wide push-based transactions, which can hamper or restrict the ability to perform complex and logic-rich transactions in a lightweight manner.

SUMMARY

Embodiments include a method, system, and computer program product for transferring cryptocurrency amounts. In accordance with one or more embodiments, a computer implemented method for transferring cryptocurrency amounts includes receiving, by a processing device, a request to transfer an amount of a cryptocurrency from a first storage location, and transmitting the request to a transaction module configured to perform a transfer of the amount of the cryptocurrency. The method also includes, in response to the request, automatically generating by the transaction module a credit value and a debit value as a related pair, each of the credit value and the debit value having an identifier that relates the credit value and the debit value to the amount of the cryptocurrency, one of the credit value and the debit value being a positive value and another of the credit value and the debit value being a negative value, and transferring the amount of the cryptocurrency by the transaction module from a wallet connected to the transaction module to a second storage location.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

DETAILED DESCRIPTION

Figure 1:
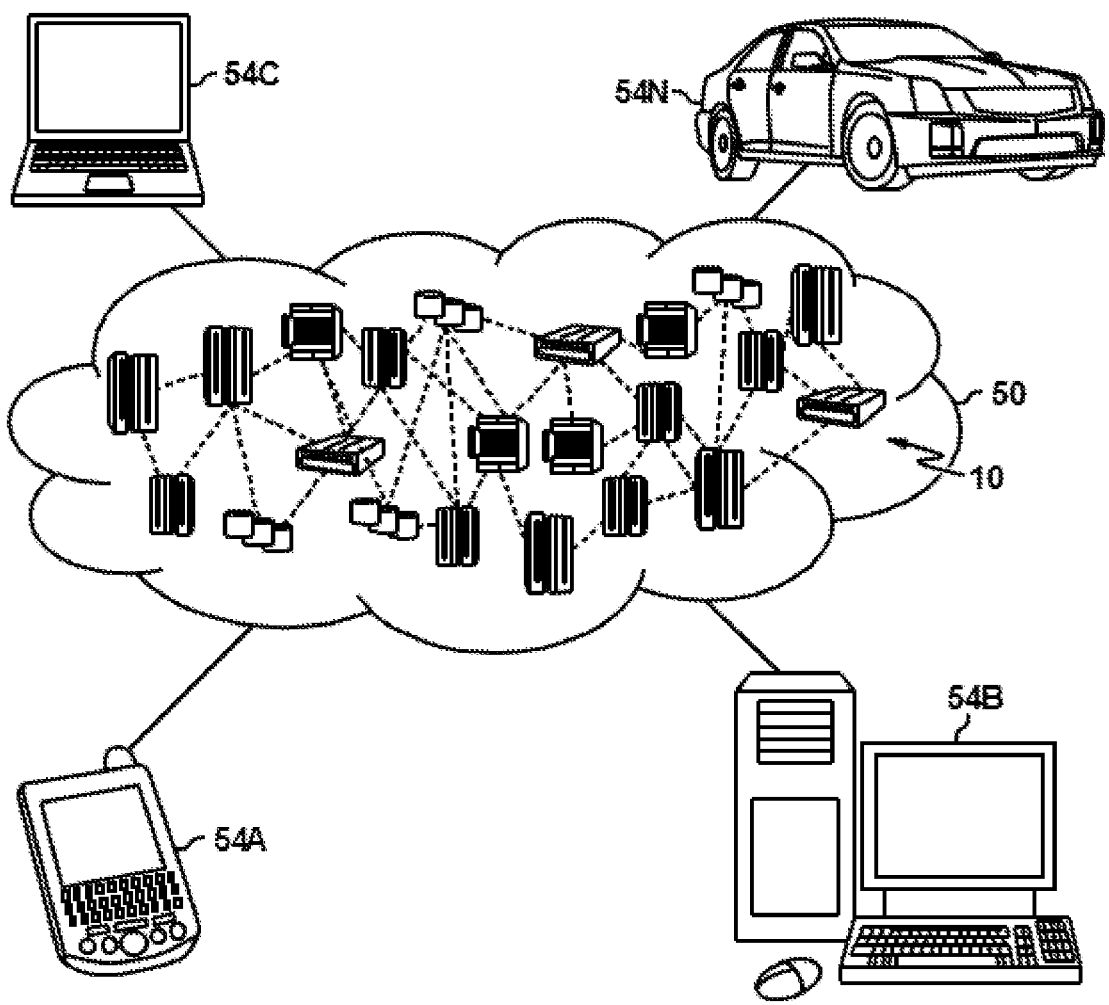
FIG. 1 depicts a cloud computing environment according to an embodiment of the present invention.

One or more embodiments of the present invention provide method(s), device(s), system(s) and computer program product(s) for performing one or more transfers of cryptocurrency between devices, locations and/or nodes in a network. In one or more embodiments, a processing device (e.g., a node) is configured to generate a credit value and a debit value (e.g., a credit coin and a debit coin) as a pair that is related to an amount of a cryptocurrency to be transferred. In one or more embodiments, the processing device is included in a network that utilizes a blockchain or other distributed network and is configured to perform asset transfers in a push-based manner using credit values and/or debit values created for cryptocurrency transactions. One or more embodiments described herein are directed to technically light-weight, but functionally logic-rich transactions on distributed ledger networks, such as blockchain networks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes 10, such as are exemplarily depicted in FIG. 1.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. An example of a node 10 is discussed in more detail below with reference to FIG. 3.

Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
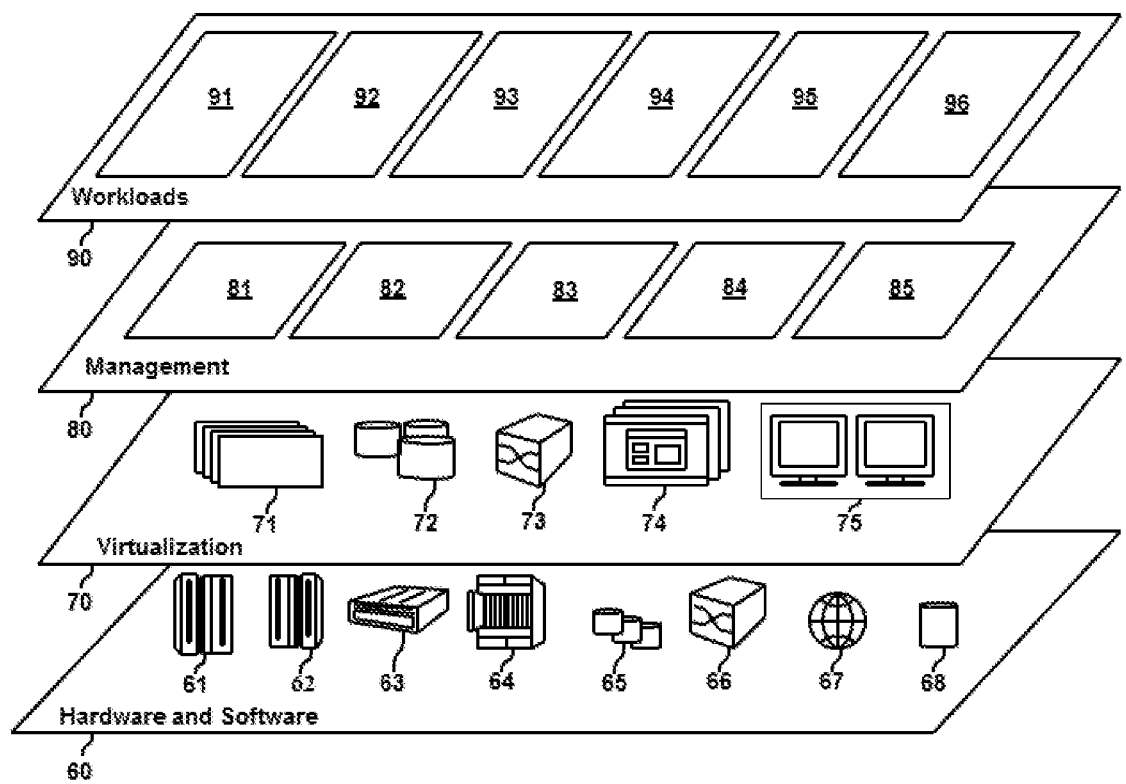
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cryptocurrency transfer processing 96 in accordance with one or more embodiments of the present invention.

Figure 3:
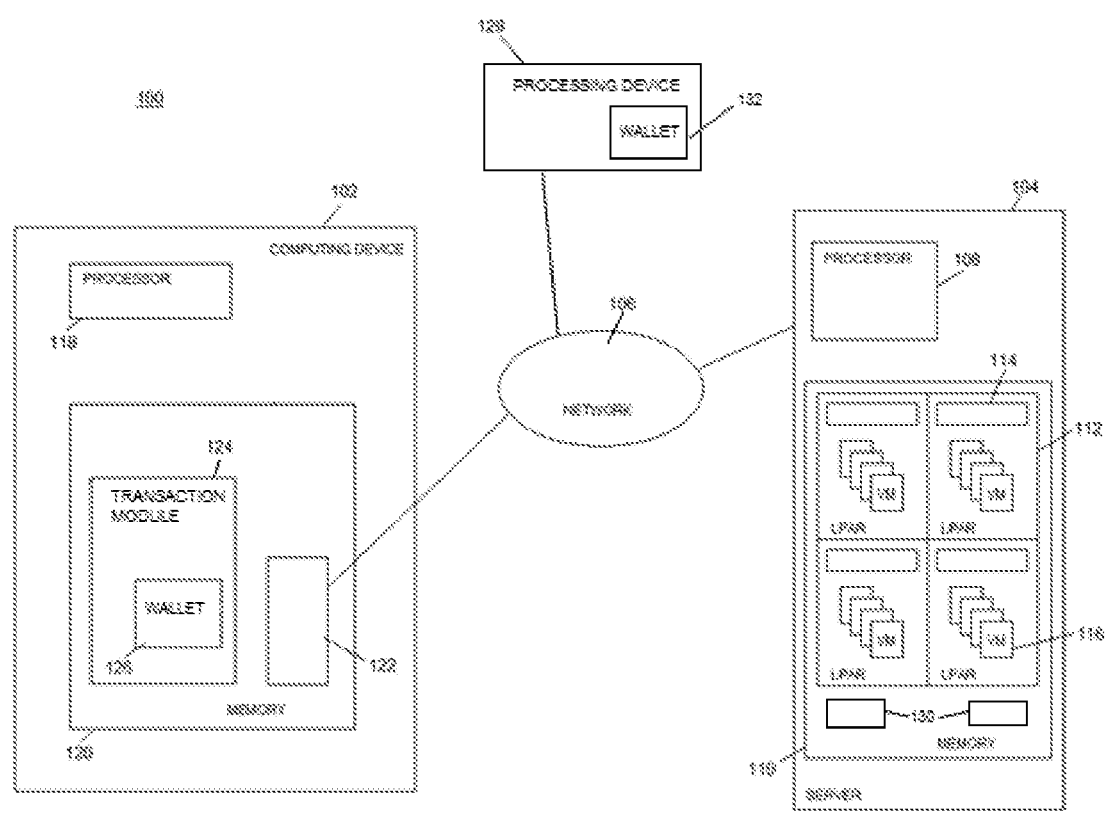
FIG. 3 depicts an embodiment of a computing environment that includes a processing device having processing modules configured to perform cryptocurrency transactions and cryptocurrency transfer functions according to an embodiment of the present invention.

Turning now to an overview of one or more embodiments of the present invention, a processing device or system, such as the cryptocurrency currency transfer processing 96 of FIG. 2, and/or one more processing devices, modules and/or nodes discussed below and shown in FIG. 3, is configured to perform or facilitate transfers of cryptocurrency using a distributed ledger or transaction system. For example, the processing device is configured to perform transfer or transaction functions using bitcoin currency and/or using a blockchain system.

The processing device is configured to perform and/or facilitate cryptocurrency transfers by creating, for each transaction or transfer of a cryptocurrency amount, a debit value and a credit value representing a cryptocurrency amount that is less than or equal to the cryptocurrency amount to be transferred. In one or more embodiments, the debit value is a negative value (e.g., denoted by a negative sign) that represents a currency amount that is deducted from a sender or payer of the currency amount, and the credit value is a positive value (e.g., denoted by a positive sign) and represents an amount that is added or credited to a payee or receiver. For a given transfer or transaction of an amount of currency, the processing device that initiates the transfer generates a pair of a credit value and a debit value having opposite signs, both of which have the same value that is related to the amount of currency. For example, the credit value and the debit value are equal to the amount of currency or are less than the amount of currency. In addition, each of the credit value and the debit value has an identifier (ID) of their relation and of the amount of currency to be transferred.

One or more embodiments described herein facilitate light-weight, but functionally logic-rich, transactions on blockchains and other distributed ledger systems. One or more embodiments described herein can support more transaction types (e.g. credit asset transfers) than are currently implemented in traditional digital currency blockchains and other systems.

FIG. 3 illustrates an embodiment of a computing environment that includes a processing device having processing modules configured to perform cryptocurrency transactions and currency transfer functions as described herein. Transactions and currency transfer functions discussed herein allow for network-wide (e.g., all nodes in a network or all nodes in a network of nodes having currency transfer capability) push-based transfers and transactions using a distributed ledger system. The devices and systems are described in conjunction with cloud services provision and billing; however it is understood that the devices and systems, as well as the methods and transactions discussed herein, are not limited to cloud service transactions and may be applied to any type of financial transaction involving cryptocurrencies.

Referring now to FIG. 3, a processing environment 100 includes a processing device 102 that is able to communicate with a computing resource such as a remote processing device, e.g., a server 104. The processing device 102, in one or more embodiments, is a user device such as a computer (e.g., desktop or laptop) or a mobile device such as smartphone or tablet. The processing device 102 may be used to request products or services from the server 104.

In one or more embodiments, the processing environment 100 and/or components thereof are configured as part of a cloud computing environment, such as the cloud computing environment of FIG. 1. For example, the processing device 102, the server 104 and/or other device or system can be part of a cloud computing node 10 (FIG. 1). The processing device 102 is only one example of a suitable cloud computing node and is not intended to suggest any limitation as to the scope of use or functionality of embodiments of the invention described herein. Regardless, the cloud computing node is capable of being implemented and/or performing any of the functionality set forth hereinabove.

The processing device 102 may be connected to the server 104 via any suitable type of connection, such as a network 106 (e.g., the internet, a wide area network, a wireless network, etc.). The server 104 may constitute or be part of a product or service provider, such as an online seller, storage service or cloud computing service provider. The processing environment 100 and/or components thereof can be used to perform various actions, including receiving and processing user inputs and performing various processing actions as described herein, including storing and processing data, executing programs and displaying information.

For example, the server 104 includes a processor 108 and a memory 110 that is partitioned into memory regions 112, also referred to in some instances as logical partitions (LPARs). Each region may store a hypervisor 114 and one or more virtual machines (VMs) 116. In one or more embodiments, the memory 110 and/or VMs 116 are available to remote devices and users (e.g., the processing device 102) for utilization as cloud service units for various fees.

The processing device 102 also includes a processor 118 and a memory 120 that stores various processing modules. One or more processing modules may be configured as or incorporated in a program/utility suite, which may be stored in the memory 120 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments described herein.

For example, the processing device 102 includes an interface module 122, such as a web browser or a program suite, provides connectivity to the server 104, other computers or devices, and/or other nodes connected to the network 106.

The processing device 102 also includes processing modules to perform and/or facilitate cryptocurrency transfers. For example, a transaction module 124 (e.g., a bitcoin client application) conducts transactions on the network 106, is stored in the memory 120 and includes currency and network 106 information such as information regarding currency balances and accounts, the state of the network and various transactions and encryption information used to secure currency data. The transaction module 124 may include or be connected to a wallet application 126 (also referred to simply as a "wallet"). The wallet stores information including account balance information and transaction records, and may also manage account information and perform transactions on the network 106. The wallet may be a program or module configured to both store account balance information and conduct transactions, or may be configured to store account balance information and interact with another program such as the transaction module 124.

Use of the term "wallet" is not intended to limit the wallet to any particular type of cryptocurrency, application or environment, and is to be understood as including any suitable program, software, processing module or other entity configured to store cryptocurrency information and/or perform cryptocurrency transfer functions.

In the example of a bitcoin system, a wallet (e.g., the wallet 126) can store encryption key pairs for each stored bitcoin address, where each key pair includes a private key and a public key used for executing and recording transactions. A wallet can store records indicating cryptocurrency amounts (e.g., described as numbers of units or numerical values) owned by the owner of the wallet. An "amount" of a cryptocurrency that is transferred to a receiver (or payee) refers to the economic value that is being transferred, which may be represented by a numerical value. The amount may be a number of cryptocurrency units (e.g., a number of bitcoins). The number of cryptocurrency units may be an integer number of units (e.g., 2 bitcoins) and/or a fractional value of a cryptocurrency unit (e.g., 0.1 bitcoins or 2.1 bitcoins). In the following description, cryptocurrency units or amounts may be referred to as coins, which may be bitcoins or any other suitable cryptocurrency or electronic currency.

The processing device 102 and the server 104 (and/or components thereof) are configured as nodes operably connected via network 106. Any number of systems and devices may be connected to the network 106. For example, a processing device 128 (e.g., another client, server, database, etc.) may communicate with the server 104 to acquire cloud services or serves as a third party payer to facilitate transactions. For example, the processing device 128 may be a third party payment provider connected to the network 106 and accessed by the processing device 102 to facilitate payment from a user account to the server 104. In another example, the processing device 128 may be an owner of the computing device 102 and/or one or more components therein (e.g., one or more VMs).

In addition to the processing device 102, other nodes connected to the network 106 may also store one or more wallets and/or other suitable applications for performing transactions. For example, the server 104 may store one or more wallets 130 and processing device 128 may store one or more wallets 132. It is noted that each node may include multiple wallets. For example, the server 104 can store multiple wallets for individual VMs, partitions and/or groups of VMs.

In one or more embodiments, each of the processing device, server and third party device is connected as nodes in a network for transferring cryptocurrencies. An example of such a network is a distributed ledger network that maintains a record (ledger) of transactions distributed across the network. An example of such a network is a blockchain network, which maintains a distributed ledger referred to as a blockchain for creation and transfer of cryptocurrencies such as bitcoins.

In a distributed ledger system such as a blockchain system, a distributed ledger is maintained by every participant in the system. For example, each of the nodes in the network of FIG. 3 (e.g., the computing device, server and third party) can store a copy of the blockchain or distributed ledger.

In one or more embodiments, transfer of cryptocurrency such as bitcoin is accomplished via transaction records, which may be referred to simply as "transactions." A "transaction" refers to a data structure that is broadcast to the network and becomes part of the blockchain if valid. In a distributed ledger network such as a blockchain network, a transaction is created for each transfer of a cryptocurrency amount. All transactions in the network are logged in the distributed ledger, a copy of which is stored by each node.

In one or more embodiments, each transaction includes a transaction identifier (ID), descriptors and metadata, inputs and outputs. For distributed ledger systems, the transaction is broadcast to the network and collected into blocks of the blockchain or units of another distributed ledger. An initiator of a transaction creates the transaction and inputs currency values from one or more addresses. One or more outputs are generated that provide instructions to transfer currency amounts to one or more addresses. In the blockchain model, an output is referred to an "unspent transaction output", or UTXO. Embodiments described herein allow for the creation of both debit and credit coins to the blockchain UTXO model.

In one or more embodiments, an amount of currency to be transferred may be referred to as a "coin", a credit value may be referred to as a "credit coin" and a debit value may be referred to as a "debit coin." In one or more embodiments, a "coin" refers to a unit of value of a cryptocurrency, such as a bitcoin or a fraction of a bitcoin. For example, in a bitcoin system, a coin may refer to a bitcoin amount or number of bitcoin units, such as one bitcoin (BTC), 0.5 BTC or 0.001 BTC.

A coin may refer to any type of currency, any amount of currency and any currency unit. Thus, descriptions of coins herein are not intended to limit the descriptions to any specific value or amount or to any particular type of electronic currency.

Figure 4:
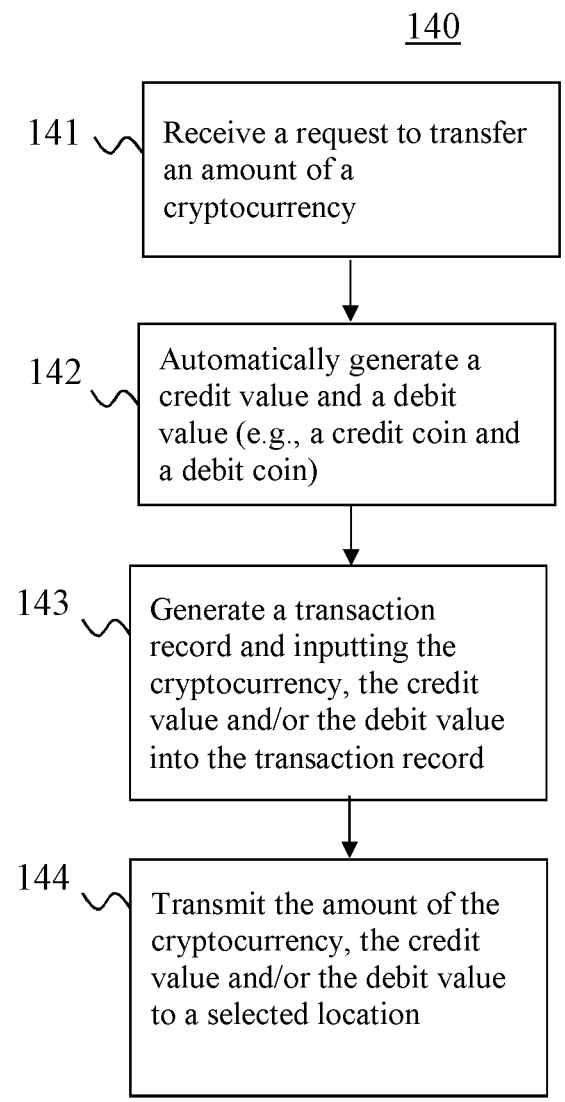
FIG. 4 is a flow diagram depicting a method of performing cryptocurrency transfers according to an embodiment of the present invention.

FIG. 4 is a flow diagram depicting a method 140 of performing cryptocurrency transfers according to one or more embodiments of the present invention. In one or more embodiments, the method 140 is performed in conjunction with a blockchain system and a bitcoin cryptocurrency, although the method 140 is not so limited and may be used with any suitable cryptocurrency and/or distributed ledger system.

As depicted in FIG. 4, the method 140 includes a number of process steps represented by blocks 141-144. One or more embodiments include the execution of all of the steps shown in blocks 141-144 in the order described. However, certain steps may be omitted, steps may be added, and/or the order of the steps changed. Although one or more embodiments are described with reference to the processing device 102 (FIG. 3) and/or one or more other components of the processing environment 100 (FIG. 3), the invention is not so limited.

As discussed above, the method 140 can be configured to be performed in conjunction with a network configured to store a distributed ledger or other transaction record, such as a blockchain network. In one or more embodiments, the method 140 is performed in a push-based manner, where transactions are pushed from individual nodes, in contrast to centralized systems where transactions are pulled from a central storage location. The method 140 allows for a variety of types of asset transfers and provides flexibility for performing relatively complex transactions. The method 140 is discussed in the context of a bitcoin blockchain network for illustrative purposes, however the method 140 may be applied to any suitable cryptocurrency system or network.

In step 141, a processing device receives a request or instruction to transfer an amount of a cryptocurrency. For example, based on user instruction, the processor 118 instructs the transaction module 128 to transfer a selected amount of cryptocurrency from a storage address controlled by the transaction module 128 to another address (e.g., in the server 104).

For example, a request is received by the transaction module 128 to transfer an amount of bitcoins, e.g., a number of bitcoin units such as a number of bitcoins and/or a fraction of a bitcoin. The transaction module 128 selects an amount of bitcoins, e.g., a number of bitcoin units, stored in one or more storage addresses, such as addresses in the wallet 126.

In step 142, the transaction module 128 generates a credit value and a debit value as a pair and relates the pair to the selected amount of the cryptocurrency. The credit value and the debit value have opposite signs (i.e., positive and negative) and have identifiers that relate the credit value and the debit value to each other and to selected amount of the cryptocurrency.

For example, the transaction module 128 automatically generates a credit coin and a debit coin. The credit coin is a value that is equal to the debit coin and is less than or equal to the selected amount of bitcoins. The credit coin and the debit coin have opposite signs. In this example, the credit coin is a positive value and the debit coin is a negative value.

In step 143, in one or more embodiments, the transaction module 128 creates a transaction record (i.e., a transaction) and applies the credit value, the debit value and/or the selected amount of the cryptocurrency as an input to the transaction record. The transaction record is broadcast to a plurality of nodes in a network for inclusion in a distributed ledger (e.g., a blockchain).

In step 144, the amount of the cryptocurrency, the credit value and/or the debit value are transmitted (e.g., via one or more transaction records) to a selected location, such as an address previously designated by the receiving entity (e.g., the server 104). For example, the transaction module 128 transmits the credit coin and the debit coin to different addresses or to the same address. The selected amount of bitcoins may be transmitted with the credit coin and/or the debit coin to the same location, or transmitted to a different location. As is evident in this example, the credit coin, the debit coin and the selected amount of bitcoins are independently transferrable, i.e., can be assigned different addresses or otherwise transferred independently to different locations.

Figure 5:
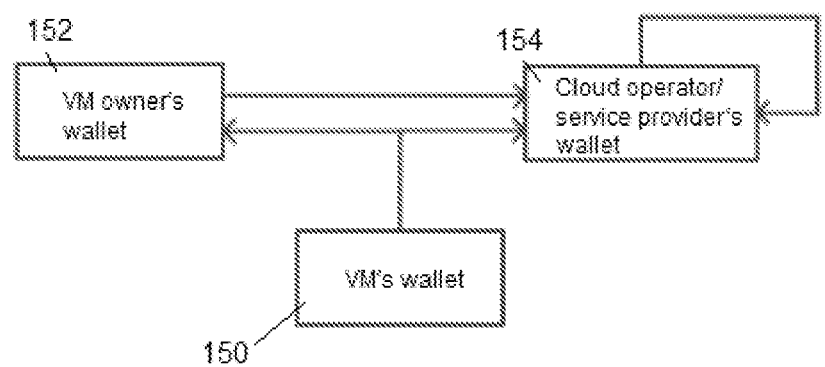
FIG. 5 depicts an example of network nodes configured to perform performing cryptocurrency transfers according to an embodiment of the present invention.

Various examples of transfers that can be performed using the method 140 are discussed below. By way of overview, in the examples discussed in more detail below, transfers are performed by one or more nodes in a network, and the currency values transferred are described as bitcoin units for illustration purposes. By way of further overview, transfers may be described with reference to one or more exemplary nodes shown in FIG. 5, which depicts an example of network nodes configured to perform cryptocurrency transfers according to an embodiment of the present invention. In FIG. 5, the network nodes are shown as nodes 150, 152 and 154. Each of the nodes can transfer cryptocurrency amounts, debit values and/or credit values with one another.

In the following examples, node 150 corresponds to a wallet stored by a service unit consumer such as a VM provided by a cloud service, node 152 corresponds to a wallet stored by an owner of the service unit consumer, and node 154 corresponds to a wallet stored by a cloud operator or service provider. Node 150, in the following examples, is a wallet associated with a consumer of a service unit. A service unit can be any kind of service performed or provided in a certain period of time, a certain size of storage, an API call, etc. The services can be consumed on-demand, either manually or automatically.

In one or more embodiments, the nodes can be considered to form a peer-to-peer network, which underlies a blockchain protocol; each node has a unique address (generally derived from the public key of the node) for a blockchain transaction.

A node may generate a transaction based on user input or may act autonomously or semi-autonomously. For example, node 150 may be an autonomous entity (e.g., a VM) that uses service units and can autonomously transfer funds to pay for service units consumed. As depicted in FIG. 5, nodes 150 and 154 can transfer funds directly therebetween, or via a third party entity, e.g., the node 152. The third party entity (e.g., node 152) may be, e.g., a user that owns node 150 or a third party payment processor.

Figure 6:
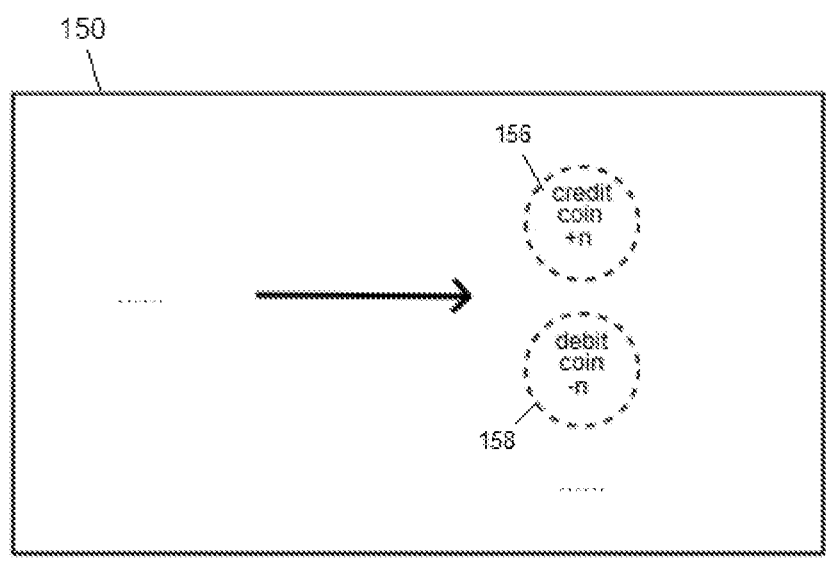
FIG. 6 illustrates an example of the creation and transmission of a debit value and a credit value according to an embodiment of the present invention.

FIG. 6 illustrates an example of the creation and transmission of a debit value and a credit value according to an embodiment of the present invention. In the example of FIG. 6, we will assume that the node 150 receives a request to transfer an amount of bitcoins (not shown) to the node 154 via a third party (e.g., the node 152) that stores the amount of bitcoin units to be transferred.

In the example of FIG. 6, node 150 is an authorized node of node 154 (e.g., a cloud services provider) and is instructed or requested to transfer a bitcoin amount n (i.e., an amount of bitcoins) to node 154. The bitcoin amount n may correspond to a service fee. Node 150 creates a credit coin 156 having a value of positive n (+n) and a debit coin 158 having a value of negative n (−n). The credit coin 156 and the debit coin 158 each have an identifier relating the credit coin 156 and the debit coin 158 to the requested bitcoin amount to be transferred. In the example of FIG. 6 and subsequent examples, debit and credit coins are depicted with dashed lines and actual bitcoin amounts are depicted with solid lines.

Figure 7:
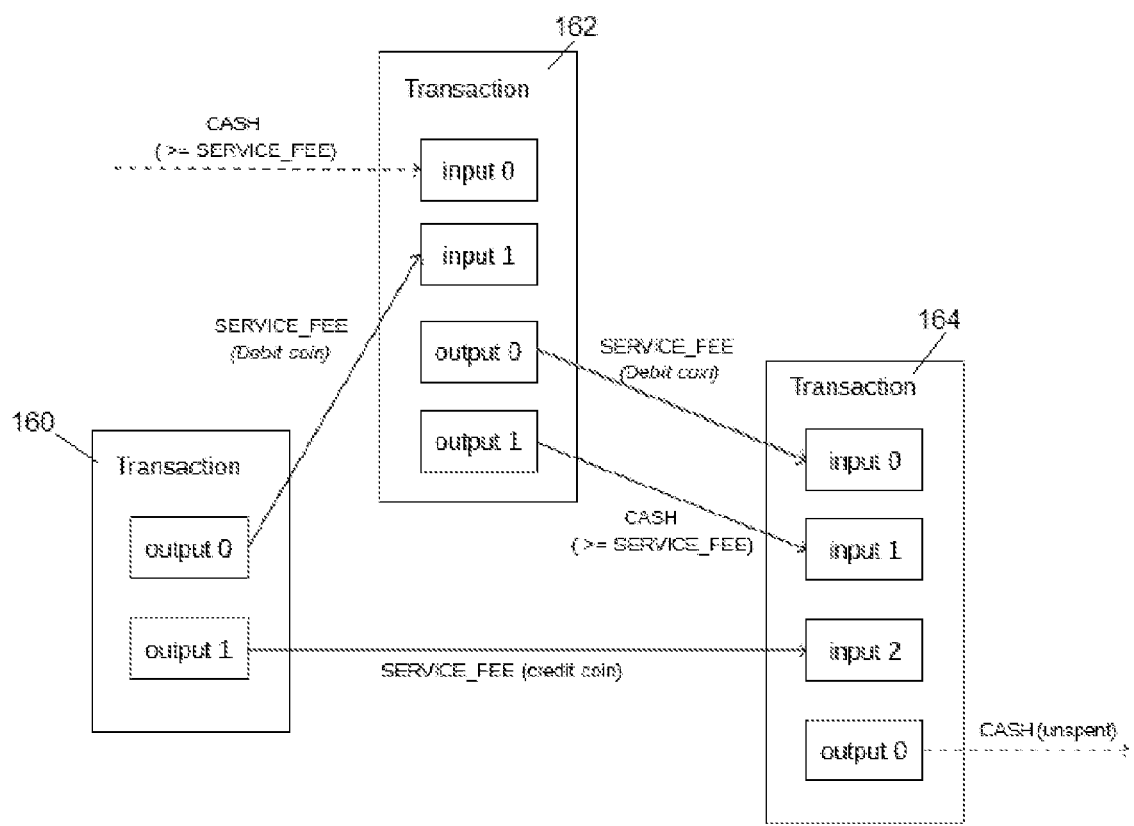
FIG. 7 depicts a cryptocurrency transfer logic flow according to an embodiment of the present invention.

Referring now to FIG. 7, the node 150 creates a transaction 160 according to bitcoin protocols, and outputs a credit coin 156 and a debit coin 158. The debit coin 158 is sent to node 152 via a first transaction 160 output ("output 0") and the credit coin 156 is sent to node 154 via a second transaction 160 output ("output 1").

It is noted that, in some instances, it is not necessary to issue a debit coin or a credit coin that indicates a specific amount. As long as a debit coin receiver (e.g., node 154) has authorized a credit/debit coin creator or issuer (e.g. node 150) to send debit coins and credit coins, transaction generated by the credit/debit coin issuer will be valid. Thus, in the example of FIG. 7 and other instances of this type of transaction, the credit/debit coin issuer does not need to output a currency value as part of the debit and credit coin to ensure validity of the transaction.

Node 152 creates a transaction 162 and receives a bitcoin amount that is greater than or equal to the service fee amount n via a first transaction 162 input ("input 0"). The node 152 also receives the debit coin 158 via a second transaction 162 input ("input 1"). Node 152 then sends the bitcoin amount n equal to the service fee to the node 154 via a first transaction 162 output ("output 0"), and also sends the debit coin 158 via a second transaction 162 output ("output 1").

Node 154 creates a transaction 164, receives the bitcoin amount n via a first transaction 164 input ("input 0"), and receives the debit coin 158 via a second transaction 164 input ("input 1"). Node 154 also receives the credit coin 156 via a third transaction 164 input ("input 2"). Node 154 then cancels the values of the credit coin 156 and the debit coin 158. The bitcoin amount n can be retained by the node 154 or sent to another location, e.g., via a transaction 164 output ("output 0").

As illustrated in the above example, the systems and methods described herein may be configured to operate in a push-based manner, in which generation of debit and credit values are triggered by the commodity, product or service to be paid for. For example, a commodity such as a service unit (e.g., node 150 described above) is automatically triggered to issue a pair of a debit value and a credit value (e.g., a debit coin and a credit coin pair) all by the commodity itself.

Figure 8:
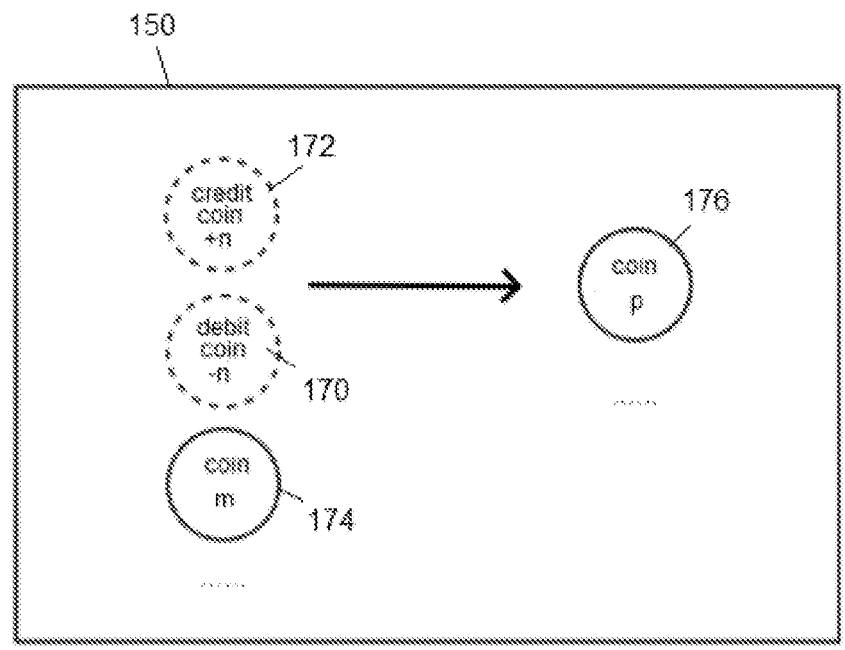
FIG. 8 illustrates an example of the creation of a debit value and a credit value according to an embodiment of the present invention.

FIG. 8 illustrates an example of the creation of a debit value and a credit value according to an embodiment of the present invention. This example depicts a direct transfer of funds from node 150 to another location (e.g., to node 152). In this example, node 150 inputs one or more debit coin and credit coin pairs (each pair including a debit coin 170 and a credit coin 172) and inputs one or more bitcoins 174 having an amount m to a transaction (e.g. transaction 160), and does not output the one or more pairs from the transaction. The node 150 may output one or more bitcoins 176 having an amount p from the transaction to any desired location (e.g., the node 152 or the node 154). In this example, the total bitcoin amount p (e.g., total number of bitcoin units) should not be less than the amount n represented by the pairs.

Figure 9:
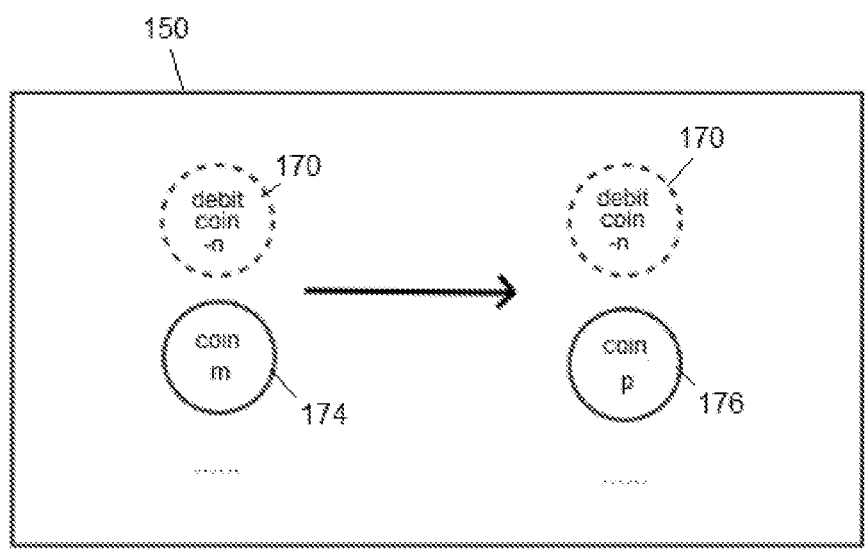
FIG. 9 illustrates an example of the creation of a debit value according to an embodiment of the present invention.

FIG. 9 illustrates an example of the creation of a debit value according to an embodiment of the present invention. In this example, node 150 creates one or more debit coins 170 (each representing an amount n) and one or more bitcoins 174 (having an amount m), and inputs the one or more debit coins 170 and the one or more bitcoins 174 to a transaction. The node 150 may output the one or more debit coins 170 from the transaction to a selected location, and may output one or more bitcoins 176 (having an amount p) to the same selected location or to a different location. Alternatively, node 150 creates and inputs one or more credit coins and one or more bitcoin amounts to a transaction, and outputs the one or more credit coins and one or more bitcoin amounts to one or more selected locations. In this example, the total amount m of bitcoins input to a transaction should be greater than or equal to the amount n represented by the debit coin(s) or the credit coin(s). The total amount p of bitcoins output to a single address should be greater than or equal to the total value of the debit coin(s) or the credit coin(s).

In one embodiment, for the transaction types illustrated in the examples of FIGS. 8 and 9, the following conditions should be met. The amount n of a debit coin should be greater than or equal to the bitcoin amount m, i.e., m is greater than or equal to the absolute value of n. There is no restriction on the amount of any number of credit coins (the credit value) input to a transaction. For a given transaction, multiple locations (addresses) can be assigned and debit coins, credit coins and/or bitcoins can be sent to multiple locations. For each location, the bitcoin amount output to the location and received at the location should be more than the debit value received at the location, i.e., p is greater than or equal to the absolute value of n. There is no restriction on the credit value that can be output to a given address or receiver.

The above examples demonstrate the ability of processors and networks to perform various types of transactions using credit and debit coin or value pairs, including relatively simple transactions in addition to more complex transactions such as credit asset transfers. The examples discussed herein are not intended to limit the types of transactions or transfers that can be performed according to the embodiments described herein.

Technical effects and benefits include the ability to autonomously send credits and debits in transactions, and thereby perform a wide variety of transactions, including more complex and logic-rich transactions in a light-weight manner. Embodiments described herein provide support for logically all-node-wide push-based transactions, allowing for more complex transactions to be performed using distributed ledger cryptocurrency exchange systems.

Other advantages include the ability to perform cloud service billing transactions using a de-centralized and push-based system that removes the need for central "banks", which are easily tunable and allow for high billing frequency, and allow for flexible and on-demand billing.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for transferring cryptocurrency amounts, the method comprising:
    receiving, by a processing device, a request to transfer an amount of a cryptocurrency from a first storage location, the first storage location including a first wallet owned by a payer and storing an amount of cryptocurrency;
    transmitting the request to a transaction module configured to perform a transfer of the amount of the cryptocurrency, the transaction module being part of a distributed ledger network including a distributed ledger maintained by the payer and a payee;
    in response to the request, initiating a transaction by the transaction module, generating a credit value and a debit value as a related pair, the credit and debit value independently transferable and representing the amount of the cryptocurrency, broadcasting the transaction, the credit value and the debit value to the distributed ledger network, and transferring the debit value to the payer and transferring the credit value to the payee, each of the credit value and the debit value having an identifier that relates the credit value and the debit value to the amount of the cryptocurrency, one of the credit value and the debit value being a positive value and another of the credit value and the debit value being a negative value, at least one of the credit value and the debit value applied as an input to a transaction record in the distributed ledger network; and
    transferring the amount of the cryptocurrency by the transaction module from a wallet connected to the transaction module to a second storage location, the second storage location including a second wallet owned by the payee, wherein transferring the amount includes transferring the credit value from the payer to the payee, the debit value and the credit value configured to be cancelled by the payee to complete the transaction.

2. The method of claim 1, wherein the processing device and the second storage location are connected to a network, and transferring the amount of the cryptocurrency includes storing information regarding the transfer in a distributed ledger, the distributed ledger stored by a plurality of nodes connected to the network.

3. The method of claim 2, wherein the distributed ledger is a blockchain.

4. The method of claim 3, wherein the debit value is less than or equal to the amount of the cryptocurrency.

5. The method of claim 1, wherein generating the credit value and the debit value includes generating the transaction record configured to be transmitted from the processing device, and inputting the credit value and the debit value to the transaction record.

6. The method of claim 5, wherein generating the credit value and the debit value includes inputting the amount of the cryptocurrency as an input to the transaction record, and outputting the amount of the cryptocurrency and one of the credit value and the debit value from the transaction record.

7. The method of claim 5, wherein generating the credit value and the debit value includes outputting the credit value and the debit value from the transaction record, and transmitting the credit value and the debit value to different storage locations.

8. The method of claim 1, wherein transferring the amount of the cryptocurrency includes transferring the cryptocurrency amount with the debit value to the payee to complete the transaction.

9. A system for transferring cryptocurrency amounts, the system comprising:
- a processing device connected to a network and configured to transfer cryptocurrency amounts, the processing device operably coupled to a memory; and
- a transaction module stored in the memory, the transaction module being part of a distributed ledger network including a distributed ledger maintained by the payer and a payee, the transaction module including program instructions to cause the processing device to perform:
- receiving a request to transfer an amount of a cryptocurrency from a first storage location, the first storage location including a first wallet owned by a payer and storing an amount of cryptocurrency;
- in response to the request, initiating a transaction by the transaction module, generating a credit value and a debit value as a related pair, the credit and debit value independently transferable and representing the amount of the cryptocurrency, broadcasting the transaction, the credit value and the debit value to the distributed ledger network, transferring the debit value to the payer and transferring the credit value to the payee, each of the credit value and the debit value having an identifier that relates the credit value and the debit value to the amount of the cryptocurrency, one of the credit value and the debit value being a positive value and another of the credit value and the debit value being a negative value, at least one of the credit value and the debit value applied as an input to a transaction record in the distributed ledger network; and
- transferring the amount of the cryptocurrency by the transaction module from a wallet connected to the transaction module to a second storage location, the second storage location including a second wallet owned by the payee, wherein transferring the amount includes transferring the credit value from the payer to the payee, the debit value and the credit value configured to be cancelled by the payee to complete the transaction.

10. The system of claim 9, wherein transferring the amount of the cryptocurrency includes storing information regarding the transfer in a distributed ledger, the distributed ledger stored by a plurality of nodes connected to the network.

11. The system of claim 10, wherein the processing device is configured to transfer the cryptocurrency amounts in a cloud environment.

12. The system of claim 10, wherein the debit value is less than or equal to the amount of the cryptocurrency.

13. The system of claim 9, wherein generating the credit value and the debit value includes generating the transaction record configured to be transmitted from the processing device, and inputting the credit value and the debit value to the transaction record.

14. The system of claim 13, wherein generating the credit value and the debit value includes inputting the amount of the cryptocurrency to the transaction record, and outputting the amount of the cryptocurrency and one of the credit value and the debit value from the transaction record.

15. The system of claim 13, wherein generating the credit value and the debit value includes outputting the credit value and the debit value from the transaction record, and transmitting the credit value and the debit value to different storage locations.

16. The system of claim 9, wherein transferring the amount of the cryptocurrency includes transferring the cryptocurrency amount with the debit value to the payee to complete the transaction.

17. A computer program product for transferring cryptocurrency amounts, the computer program product comprising a computer readable storage medium having program instructions embodied therewith, the program instructions executable by a processor to cause the processor to perform:
- receiving, by a processing device, a request to transfer an amount of a cryptocurrency from a first storage location, the first storage location including a first wallet owned by a payer and storing an amount of cryptocurrency;
- transmitting the request to a transaction module configured to perform a transfer of the amount of the cryptocurrency, the transaction module being part of a distributed ledger network including a distributed ledger maintained by the payer and a payee;
- in response to the request, initiating a transaction by the transaction module, generating a credit value and a debit value as a related pair, the credit and debit value independently transferable and representing the amount of the cryptocurrency, broadcasting the transaction, the credit value and the debit value to the distributed ledger network, transferring the debit value to the payer and transferring the credit value to the payee, each of the credit value and the debit value having an identifier that relates the credit value and the debit value to the amount of the cryptocurrency, one of the credit value and the debit value being a positive value and another of the credit value and the debit value being a negative value, at least one of the credit value and the debit value applied as an input to a transaction record in the distributed ledger network; and
- transferring the amount of the cryptocurrency by the transaction module from a wallet connected to the transaction module to a second storage location, the second storage location including a second wallet owned by the payee, wherein transferring the amount includes transferring the credit value from the payer to the payee, the debit value and the credit value configured to be cancelled by the payee to complete the transaction.

18. The computer program product of claim 17, wherein the processing device and the second storage location are connected to a network, and transferring the amount of the cryptocurrency includes storing information regarding the transfer in a distributed ledger, the distributed ledger stored by a plurality of nodes connected to the network.

19. The computer program product of claim 18, wherein the distributed ledger is a blockchain and the cryptocurrency is a bitcoin currency.

20. The computer program product of claim 17, wherein transferring the amount of the cryptocurrency includes transferring the cryptocurrency amount with the debit value to the payee to complete the transaction.

* * * * *